(No Model.)
L. RASTETTER.
SPOKE ATTACHMENT FOR VEHICLE WHEELS.
No. 518,627. Patented Apr. 24, 1894.
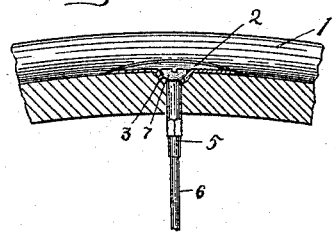
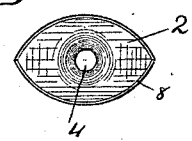
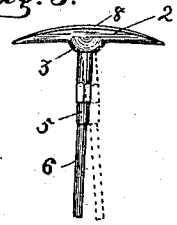
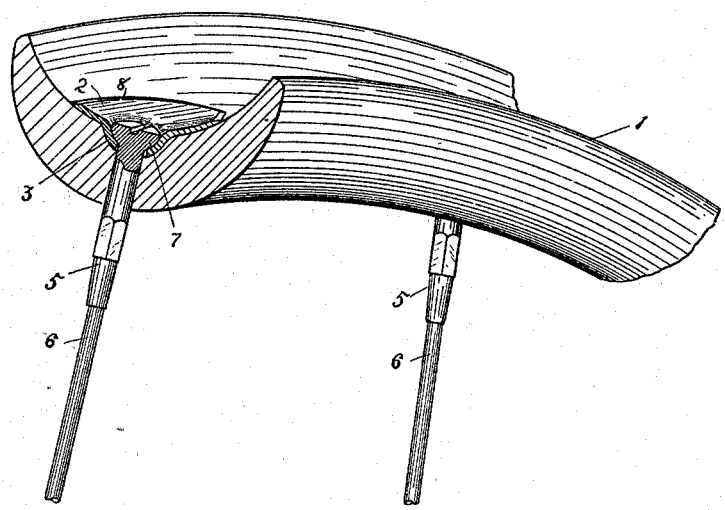
WITNESSES:
Louis Rastetter   INVENTOR:
BY Chapin & Denny
his ATTORNEYS.

UNITED STATES PATENT OFFICE.

LOUIS RASTETTER, OF FORT WAYNE, INDIANA.

SPOKE ATTACHMENT FOR VEHICLE-WHEELS.

SPECIFICATION forming part of Letters Patent No. 518,627, dated April 24, 1894.

Application filed November 13, 1893. Serial No. 490,749. (No model.)

*To all whom it may concern:*

Be it known that I, LOUIS RASTETTER, a citizen of the United States, residing at Fort Wayne, in the county of Allen, in the State of Indiana, have invented certain new and useful Improvements in Spoke Attachments for Vehicle-Wheels; and I do hereby declare that the following is a full, clear, and exact description of the invention, which will enable others skilled in the art to which it appertains to make and use the same, reference being had to the accompanying drawings, which form part of this specification.

My invention relates to improvements in spoke attachments for vehicle wheels, being specially adapted for securing metallic spokes to wooden bicycle-rims.

In the spoke attachments for wooden rims now in use, the bearing of the head of the radial nipple on the washer is greater upon one side thereof than upon the other, owing to the angle at which the said nipple enters the said washer causing an unequal wearing and support; and where the said nipple head projects above the washer, it has a constant tendency to wear and cut the bicycle tire, while to countersink the washer on said rim would either afford too small an area of resistance therefor on the rim, or by its area would weaken the rim.

The object, therefore, of my improvement is to provide a spoke attachment for bicycle wheels having wooden rims, consisting of a centrally perforated metallic washer so constructed that its lower surface is adapted to conform to the upper surface of the grooved periphery, and having a perforated hemispherical socket or nipple seat in which the head of the spoke nipple is adapted to form a full bearing adjustment at any angle of the spoke with the washer.

Another object of my invention is to provide a metallic washer for wooden rims of bicycle wheels so constructed and arranged as to afford a large area of resistance upon the periphery of the wheel, thereby strengthening the same, adapted to be secure against turning or displacement by its conformity to the said grooved periphery, and having its edges so beveled as to present a smooth wearing surface for the surmounted tire, thus affording a convenient means of countersinking the nipple head without countersinking the washer.

My invention consists in the concavo-convex washer, having beveled edges and a perforated hemispherical socket or nipple seat in which a suitable nipple head, when mounted therein will have a full, and equal bearing regardless of the angle at which the said nipple enters the said socket.

The novel feature of my invention is the construction and arrangement of my spoke attachment or improved washer, whereby it is at all times securely retained in position by its conformity to the periphery of the rim on which it rests, and whereby a uniform bearing for the hemispherical nipple-head in the socket or nipple-head seat, is maintained regardless of the angle at which it is inserted.

The object of my invention is accomplished by the mechanism illustrated by the accompanying drawings in which similar figures of reference indicate corresponding parts throughout the several views.

Figure 1 is a longitudinal vertical section of my invention in position on a wooden rim for a bicycle wheel, shown in section. Fig. 2 is a top plan of a metallic washer showing its elongated form and the central perforation in which the nipple-head is loosely mounted. Fig. 3 is a side elevation showing the spoke and nipple attached thereto, and also showing in dotted outline the adjustability of the radial nipples adjustably mounted therein. Fig. 4, is a perspective cross section of my invention in position showing the beveled edges and also showing the manner of mounting the nipple in its hemispherical socket or retaining seat.

The concavo-convex wooden rim or felly 1 in which the radial spokes are hung, is of any proper and well known form, width, and thickness and is provided in the usual manner with an outer retaining groove for any proper tire. The said rim or felly is provided at proper points thereon with suitable perforations for the admission of the radial nipples 5 having a hemispherical head 7 adapted to conform to the concave surface of the socket 3 when in position therein and being properly secured to the outer end of the spokes 6 in any suitable manner. The washer 2 of any proper size or material and of any desired form, is preferably of metal and elongated in form as seen in Fig. 2, and is provided with a vertical socket or cup 3 forming a hemispherical nipple seat, having a perforation 4 in which the nipple 2 is loosely mounted. The said socket 3 forms a suitable seat for the hemispherical nipple-head 7, of a sufficient depth to contain the said head, and is adapted to secure for said head a uniform bearing surface on which the said head will bear equally at every wearing point whatever may be the angle of the radial nipple with the said socket. The perimeter 8 of the washer 2 is so beveled as to conform to the concave surface of the said rim when in position, and thereby present no perceptible wearing surface for the said tire. The lower surface of the said washer 2 is transversely convex to conform to the grooved periphery of the said rim on which it is mounted, and is longitudinally concave to conform to the circumference of the said rim, as seen in Fig. 1. When the said washer is placed in position for use upon said rim, the said socket 3 will snugly fit a proper countersink at the outer end of the said vertical perforation in said rim, the said counter-sink being thus so arranged as not to perceptibly weaken the said rim. The upper surface of the said washer with its beveled edges, as above described, will thus present a smooth surface in conformity to the said groove and will thus afford a sufficiently large area for resistance on said rim without the necessity of counter-sinking said washer and thereby weakening the said rim. The said washer will also be secure against either lateral or longitudinal displacement by means of the said socket 3 mounted in the said countersink, and against displacement by any torsional strain by the peculiar contour thereof, whereby it is adapted to fit the said grooved periphery.

Having thus described my invention and the manner in which the same is to be applied, what I claim as new, and desire to secure by Letters Patent, is—

1. A spoke attachment for vehicle wheels comprising a concave washer 2 having a beveled perimeter and provided with a perforated hemispherical socket as described adapted to form a nipple-head seat, the said washer being adapted to conform to the contour of the grooved periphery of the rim, all substantially as set forth and described.

2. In a spoke attachment for vehicle wheels the combination of the concave washer 2 provided with a perforated socket 3 for the purpose set forth, and a beveled perimeter, the said washer being adapted to conform to the contour of the grooved periphery of the rim as described, with a nipple 5 having a ball shaped or hemispherical head adapted to fit and form a bearing in the said socket, all substantially as set forth and described.

Signed by me, at Fort Wayne, State of Indiana, this 11th day of November, 1893.

LOUIS RASTETTER.

Witnesses:
C. J. McLAIN,
WM. J. LERMONT.